United States Patent
Chen et al.

(10) Patent No.: US 6,740,764 B1
(45) Date of Patent: May 25, 2004

(54) OXIDE AND METHOD FOR PRODUCTION THEREOF

(75) Inventors: Yi Chen, Nanjing (CN); Weiping Ding, Nanjing (CN); Yuan Chun, Nanjing (CN); Ma Lian, Shanghai (CN); Ulrich Müller, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/129,826

(22) PCT Filed: Nov. 10, 2000

(86) PCT No.: PCT/EP00/11165

§ 371 (c)(1),
(2), (4) Date: May 9, 2002

(87) PCT Pub. No.: WO01/34298

PCT Pub. Date: May 17, 2001

(30) Foreign Application Priority Data

Nov. 10, 1999 (DE) .......................................... 199 54 322

(51) Int. Cl.$^7$ ................................................. B01J 29/06
(52) U.S. Cl. ....................... 549/533; 549/531; 549/523; 502/63; 502/64

(58) Field of Search ............................... 502/63, 64, 71, 502/77, 78, 79; 549/533, 531, 523

(56) References Cited

U.S. PATENT DOCUMENTS

| | | | | |
|---|---|---|---|---|
| 4,937,216 A | * | 6/1990 | Clerici et al. | .................. 502/62 |
| 5,621,122 A | | 4/1997 | Saxton et al. | |
| 6,124,227 A | * | 9/2000 | Yao et al. | ..................... 502/63 |

FOREIGN PATENT DOCUMENTS

| | | |
|---|---|---|
| EP | 0 230 949 | 8/1987 |
| EP | 0 568 336 | 11/1993 |
| EP | 1 048 639 | 11/2000 |
| WO | 99 26936 | 6/1999 |
| WO | 99 28030 | 6/1999 |

* cited by examiner

*Primary Examiner*—Kiley Stoner
*Assistant Examiner*—Christina Ildebrando
(74) *Attorney, Agent, or Firm*—Oblon, Spivak, McClelland, Maier & Neustadt, P.C.

(57) ABSTRACT

Oxide comprising at least the elements Si and Ti, at least noncrystalline silicon dioxide and at least one crystalline silicate phase which has at least one zeolite structure, with noncrystalline silicon dioxide being applied to at least one crystalline silicate phase having at least one zeolite structure, wherein the oxide has no silicon-carbon bonds.

10 Claims, No Drawings

OXIDE AND METHOD FOR PRODUCTION THEREOF

CROSS-REFERENCE TO RELATED APPLICATIONS

The present application is a 371 of PCT/EP00/11165 filed Nov. 10, 2000, which claims priority to DE 199 54322.4 filed Nov. 10, 1999.

The present invention relates to an oxide which comprises the elements silicon and titanium and also comprises at least two different silicon dioxide phases of which one is non-crystalline and at least one is a crystalline phase having a zeolite structure, wherein the oxide contains no silicon-carbon bonds. The present invention likewise relates to a process for preparing this oxide and to the use of the oxide as catalyst.

Porous oxidic materials are used in a variety of technical and industrial processes. Particular mention may be made of oxides which have a zeolite structure. Preferred fields of application are, for example, catalytic processes in which these materials, inter alia, are used as catalyst.

In some of these processes, it is necessary for the acidity of the oxidic material, which is obtained as acidic material from particular production processes, to be reduced. At the same time, the material whose acidity has been reduced should be sufficiently stable for this acidity-modifying treatment not to have to be repeated after regeneration of the oxidic material.

U.S. Pat. No. 4,937,216 describes, for example, a catalyst for the epoxidation of olefins which comprises a synthetic zeolite of the formula $xTiO_2(1-x)SiO_2$. The surface of the catalyst used for the epoxidation bears Si—O—Si(R)$_3$ groups which result from reaction of a precursor of the catalyst with compounds of the structure X—Si—(R)$_3$. A disadvantage of this procedure is that Si—C bonds are present in the catalyst used and these have such an adverse effect on the stability that the treatment with X—Si—(R)$_3$ compounds has to be repeated after one or more regeneration steps. Regeneration is, however, an important part of modem catalytic processes, since reuse of a catalyst is necessary from economic and ecological points of view. However, this regeneration is made difficult by insufficiently stable catalysts, so that the economic and ecological advantages are lost again.

U.S. Pat. No. 4,824,976 discloses a process for the epoxidation of olefins using the catalysts which are described in the above-discussed U.S. Pat. No. 4,937,216. Of course, this process also has the abovementioned disadvantages.

It is an object of the present invention to provide an oxide which does not have these disadvantages.

We have found that this object is achieved by an oxide comprising at least the elements Si and Ti, at least noncrystalline silicon dioxide and at least one crystalline silicate phase which has at least one zeolite structure, with noncrystalline silicon dioxide being applied to at least one crystalline silicate phase having at least one zeolite structure, wherein the oxide has no silicon-carbon bonds.

According to the present invention, the oxide can comprise one or more crystalline silicate phases each of which can have one or more zeolite structures. It is not necessary for the silicate phase or phases to be present exclusively in a zeolite structure. It is equally possible to conceive of a crystalline silicate phase which has not only one or more zeolite structures but also at least one further crystalline structure which is not a zeolite structure.

It is likewise conceivable for the oxide of the present invention to comprise at least one silicate phase which has at least one zeolite structure and at least one further silicate phase which is crystalline and has a structure which is not a zeolite structure.

Zeolites are, as is known, crystalline aluminosilicates having ordered channel and cage structures and containing micropores. For the purposes of the present invention, the term "micropores" corresponds to the definition in "Pure Appl. Chem." 57 (1985) p. 603–619, and refers to pores having a pore diameter of less than 2 nm. The network of such zeolites is made up of $SiO_4$ and $AlO_4$ tetrahedra which are joined via shared oxygen bridges. An overview of known structures may be found, for example, in W. M. Meier, D. H. Olson and Ch. Baerlocher in "Atlas of Zeolite Structure Types", Elsevier, 4th edition, London 1996.

In particular, there are zeolites which contain no aluminum and in which the Si(IV) in the silicate lattice is partly replaced by titanium as Ti(IV). Titanium zeolites, in particular those having a crystal structure of the MFI type, and possible ways of preparing them are described, for example, in EP-A 0 311 983 or EP-A 0 405 978.

Titanium zeolites having an MFI structure can be identified by means of a particular X-ray diffraction pattern and also by means of a lattice vibration band in the infrared region (IR) at about 960 cm$^{-1}$ and can in this way be distinguished from alkali metal titanates or crystalline and amorphous $TiO_2$ phases.

These are, in particular, titanium-, germanium-, tellurium-, vanadium-, chromium-, niobium-, zirconium-containing zeolites having a pentasil zeolite structure, especially the types assigned X-ray-crystalographically to the ABW, ACO, AEI, AEL, AEN, AET, AFG, AFI, AFN, AFO, AFR, AFS, AFT, AFX, AFY, AHT, ANA, APC, APD, AST, ATN, ATO, ATS, ATT, ATV, AWO, AWW, BEA, BIK, BOG, BPH, BRE, CAN, CAS, CFI, CGF, CGS, CHA, CHI, CLO, CON, CZP, DAC, DDR, DFO, DFT, DOH, DON, EAB, EDI, EMT, EPI, ERI, ESV, EUO, FAU, FER, GIS, GME, GOO, HEU, IFR, ISV, ITE, JBW, KFI, LAU, LEV, LIO, LOS, LOV, LTA, LTL, LTN, MAZ, MEI, MEL, MEP, MER, MFI, MFS, MON, MOR, MSO, MTF, MTN, MTT, MTW, MWW, NAT, NES, NON, OFF, OSI, PAR, PAU, PHI, RHO, RON, RSN, RTE, RTH, RUT, SAO, SAT, SBE, SBS, SBT, SFF, SGT, SOD, STF, STI, STT, TER, THO, TON, TSC, VET, VFI, VNI, VSV, WIE, WEN, YUG and ZON structures and to mixed structures made up of two or more of the abovementioned structures. Furthermore, titanium-containing zeolites having the ITQ-4, SSZ-24, TTM-1, UTD-1, CIT-1 or CIT-5 structure can also be used in the process of the present invention. Further titanium-containing zeolites which may be mentioned are those having the ZSM-48 or ZSM-12 structure.

Particularly preferred zeolites for the process of the present invention are Ti zeolites having an MFI, MEL or MFI/MEL mixed structure. More preferred are, specifically, the Ti-containing zeolite catalysts which are generally referred to as "TS-1", TS-2", "TS-3", and also Ti zeolites having a lattice structure which is isomorphous with β-zeolite.

Furthermore, the oxide of the present invention can comprise titanium-containing zeolites having the UTD-1, CIT-1, CIT-5, MCM-22 or MCM-61 structure. Further titanium-containing zeolites which may be mentioned are those of the ZSM-48 or ZSM-12 structure. Such zeolites are described, inter alia, in U.S. Pat. No. 5,430,000 and WO 94/29408, whose relevant contents are hereby fully incorporated by reference into the present patent application. For the purposes of the present invention, particular preference is given to Ti zeolites having an MFI structure, an MEL structure or a mixed MFI/MEL structure. Preference is likewise given to Ti zeolites having a lattice structure which is isomorphous with β-zeolite.

Apart from silicon and titanium, additional elements such as aluminum, zirconium, vanadium, tin, zinc, iron, tellurium, niobium, tantalum, chromium, cobalt, nickel, gallium, germanium, boron or small amounts of fluorine can also be present in the crystalline silicate phase or phases having at least one zeolite structure.

Accordingly, the present invention also provides an oxide as described above which comprises at least one element selected from the group consisting of Al, B, Fe, Ga, V, Zr, Ge, Sn, Zn, Te, Nb, Ta and Cr.

It is conceivable for, inter alia, one or more of these elements to be present in the above-described crystalline phase or phases having at least one zeolite structure. In particular, it is possible for one or more of these elements to be present in the zeolite structures themselves in this embodiment. However, it is of course also possible, in the case when this crystalline phase has not only the zeolite structure or structures but also at least one further crystalline structure which is not a zeolite structure, for at least one of these further structures to comprise at least one of these elements. Of course, it is also possible for one or more of these elements to be present both in at least one of the zeolite structures and in at least one of the further crystalline structures which are not zeolite structures. Any two of the crystalline structures present in the oxide of the present invention can naturally have identical or different representatives of the elements listed above.

In a further embodiment of the oxide of the present invention, one or more of these elements can also be present in one or more of any further components of the oxide which are neither crystalline nor noncrystalline silicate phases.

In general, it is conceivable for the titanium in the oxide to be present either in the noncrystalline silicate phase or phases or a crystalline silicate phase whose structure is not a zeolite structure or in one or more further components of the oxide or in two or more thereof. In the above-described zeolite structures, the titanium can accordingly be partly or completely replaced by, for example, vanadium, zirconium, chromium, niobium or iron or by a mixture of two or more thereof. The molar ratio of titanium and/or vanadium, zirconium, chromium, niobium or iron to the sum of silicon and titanium and/or vanadium,!.zirconium, chromium, niobium or iron is generally in the range from 0.01:1 to 0.1:1.

The oxide of the present invention preferably comprises at least one crystalline silicate phase having a zeolite structure and comprising Ti in addition to Si and O. Of course, the present invention also encompasses embodiments of the oxide in which at least one crystalline silicate phase having a zeolite structure comprises Ti in addition to Si and O and likewise at least one further constituent of the oxide, for example a crystalline silicate phase whose structure is not a zeolite structure, or at least one noncrystalline silicate phase or one or more other components of the oxide or two or more of these constituents, comprise Ti.

The oxide of the present invention preferably comprises titanium, vanadium, chromium, niobium, zirconium zeolites, more preferably titanium zeolites and in particular titanium silicalites.

As far as the pore structure of the crystalline silicate phase or phases having a zeolite structure is concerned, there are no particular restrictions. Thus, structures containing micropores, containing mesopores or containing macropores or containing micropores and mesopores or containing micropores and macropores or containing micropores and mesopores and macropores are conceivable, with the definition of these pores employed in the context of the present invention corresponding to the definition in "Pure. Appl. Chem." 45, p. 71 ff., and micropores having a diameter of less than or equal to 2 nm, mesopores having a diameter of greater than or equal to 2 nm up to about 50 nm and macropores having a diameter of greater than 50 nm.

Should the oxide comprise at least one further crystalline silicate phase whose structure is not a zeolite structure, then what has been said above regarding the pore structure of the crystalline silicate phase also applies to this silicate phase. Likewise, what has been said regarding the pore structure of the crystalline silicate phase also applies to any further porous components which are present in the oxide but are neither crystalline nor noncrystalline silicate phases.

Here, it is conceivable, for example, that the oxide comprises a mesostructured oxide phase which is not crystalline but nevertheless has some order. Such mesostructured oxides are described, for example, in DE-A 196 39 016, whose relevant contents are hereby incorporated by reference into the disclosure of the present patent application.

As far as the process for preparing the oxide of the present invention is concerned, there are essentially no restrictions as long as the oxide of the present invention is obtained from this process. The oxide is preferably prepared in a process in which a suitable oxidic material comprising at least one crystalline silicate phase having a zeolite structure is treated with a suitable silane or silane derivative.

Accordingly, the present invention also provides a process for preparing an oxide comprising at least the elements Si and Ti, at least noncrystalline silicon dioxide and at least one crystalline silicate phase, in which (a) an oxidic material comprising at least the elements Si and Ti and at least one crystalline silicate phase having at least one zeolite structure is prepared and (b) the oxidic material obtained from (a)
  (i) is reacted with at least one silane or at least one silane derivative or with a mixture of two or more thereof in at least one solvent to give a mixture comprising at least one oxidic reaction product and the solvent or solvents,
  the solvent or solvents is/are removed from the mixture directly subsequent to the reaction to give the oxidic reaction, product or products and
  the oxidic reaction product or products is/are calcined directly subsequent to the removal of the solvent or solvents to give the oxide, or
  (ii) is reacted in the gas phase with at least one silane or at least one silane derivative or with a mixture of two or more thereof to give at least one oxidic reaction product and
the oxidic reaction product or products is/are calcined directly subsequent to the reaction to give the oxide.

For the purposes of the present invention, the term "directly subsequent" means that between a first process step and a further process step which is carried out directly subsequent to this first process step there is no other process step which influences the one or more products resulting from the first process step. In particular, therefore, the term "directly subsequent" as used in the context of the present invention encompasses a process in which the first process step and the process step carried out directly subsequent to this first process step have a continuous transition between them and together represent a single process step.

In this process of the present invention, at least one noncrystalline silicate phase is applied to at least one crystalline silicate phase having a zeolite structure by treatment of the oxidic starting material. Of course, this also encompasses embodiments of the process in which the oxidic starting material comprises not only the crystalline silicate phase or phases having a zeolite structure but also further constituents such as one or more crystalline silicate phases having structures which are not zeolite structures or at least one noncrystalline silicate phase or one or more further components, as long as it is ensured that a non-crystalline silicate phase is applied to at least one crystalline silicate phase having a zeolite structure by means of the process.

In a preferred embodiment of the present process, an oxidic material comprising a titanium zeolite is prepared in (a). All suitable methods are in principle conceivable for the preparation of this material. The abovementioned titanium zeolites are typically prepared by reaction of an aqueous mixture of an $SiO_2$ source, a titanium oxide and a nitrogen-containing organic base, e.g. tetrapropylammonium hydroxide, in the presence or absence of alkali metal hydroxide, in a pressure vessel at elevated temperature for a number of hours or a few days until a crystalline product is obtained. This is generally filtered off, washed, dried and calcined at elevated temperature to remove the nitrogen-containing organic base. In the powder obtained in this way, at least part of the titanium is present in the zeolite framework in variable proportions of sites having four-fold, five-fold or six-fold coordination (Behrens et al., J. Chem. Soc., Chem. Commun. 1991, p. 678–680). This can be followed by repeated washing with hydrogen peroxide solution acidified with sulfuric acid, after which the titanium zeolite powder has to be dried and calcined again, as described, for example, in EP-A-0 276 362. The pulverulent titanium zeolite obtained in this way can subsequently be processed in a shaping step with addition of suitable binders. One method which can be employed for this purpose is described, for example, in EP-A 0 200 260.

The above-described crystallization of the titanium zeolite from suitable starting materials by hydrothermal reaction is generally carried out at from 50 to 250° C. over a sufficient period of time, with the pressure being the autogenous pressure at the given temperature.

As regards the production of the abovementioned shaped body, all suitable methods are conceivable. A preferred method is to admix the titanium zeolite with a binder, an organic viscosity-increasing substance and a liquid for wetting the composition and to compound this mixture in a kneader or pan mill. The composition obtained can subsequently be shaped by means of a ram extruder or screw extruder. The shaped bodies obtained are subsequently dried and, if appropriate, calcined.

It may be necessary, inter alia, to use chemically inert binders which make it possible for the oxide to be produced to be used as, for example, catalyst in the reaction of reactive starting materials.

A number of metal oxides are suitable as binders. Mention may be made by way of example of oxides of silicon, aluminum, titanium or zirconium. Silicon dioxide as binder is disclosed, for example, in U.S. Pat. No. 5,500,199 and U.S. Pat. No. 4,859,785.

In the case of such binders, it can, for example, be necessary for the content of alkali metal or alkaline earth metal ions to be very low, which makes it necessary to use binder sources which are low in or free of alkali metal and alkaline earth metal ions.

To prepare the abovementioned metal oxide binders, it is possible to use appropriate metal oxide sols as starting materials. In the preparation of, for example, the abovementioned silicon dioxide binders which are low in or free of alkali metal and alkaline earth metal ions, a silica sol which is low in or free of alkali metal and alkaline earth metal ions serves as binder source.

Such bodies can be obtained, for example, by mixing the titanium zeolite with metal oxide sol and/or metal oxide in one step of the process, with the metal oxide sol and the metal oxide in each case having a low content of alkali metal and alkaline earth metal ions.

In one embodiment of the process of the present invention, the metal oxide sol is prepared by hydrolysis of at least one metalate ester.

The metalate esters to be used for the hydrolysis can be purified prior to the hydrolysis. All suitable methods are conceivable for this. Preference is given to subjecting the metalate esters lo a distillation prior to the hydrolysis.

As regards the hydrolysis of the metalate ester, it is in principle possible to use all appropriate methods. However, the hydrolysis is preferably carried out in an aqueous medium in the process of the present invention.

The hydrolysis can be catalyzed by addition of basic or acidic substances. Preference is given to basic or acidic substances which can be removed without leaving a residue by calcination. In particular, substances selected from the group consisting of ammonia, alkylamines, alkanolamines, arylamines, carboxylic acids, nitric acid and hydrochloric acid are used. Particular preference is given to using ammonia, alkylamines, alkanolamines and carboxylic acids.

In the process of the present invention, preference is given to using orthosilicate esters as metalate esters.

The hydrolysis of the metalate esters is carried out at from 20 to 100° C., preferably from 60 to 95° C., and pH values of from 4 to 10, preferably from 5 to 9, particularly preferably from 7 to 9, in the process of the present invention.

In the process of the present invention, the hydrolysis gives metal oxide sols, e.g. silica sols, which have, for example, a content of alkali metal and alkaline earth metal ions of less than 800 ppm, preferably less than 600 ppm, more preferably less than 400 ppm, more preferably less than 200 ppm, more preferably less than 100 ppm, particularly preferably less than 50 ppm, more particularly preferably less than 10 ppm and in particular less than 5 ppm.

The metal oxide content of the metal oxide sols prepared according to the present invention is generally up to 50% by weight, preferably from 10 to 40% by weight.

In the process of the present invention, the alcohol formed in the hydrolysis is generally distilled off. However, small amounts of alcohol can remain in the metal oxide sol as long as they do not interfere in the further steps of the process of the present invention.

For industrial use, the metal oxide sols prepared according to the present invention have the advantage that they do not have a tendency to form a gel. Specific precautionary measures for preventing gel formation are thus unnecessary. The metal oxide sols prepared according to the present invention have a shelf life of several weeks, so that coordination in terms of time with further process steps does not pose a problem.

According to the present invention, a mixture comprising at least the titanium zeolite and at least one metal oxide, for example, is prepared in the process, with a metal oxide sol prepared as described above being used as metal oxide source.

There are in principle no restrictions in respect of the method of preparing the mixture. However, preference is given to spraying a suspension comprising at least the titanium zeolite and metal oxide sol in the process of the present invention.

The titanium zeolite content of the suspension is not subject to any restrictions, as long as the processability of the suspension during its preparation and spraying is ensured.

The main constituents of the suspension are, in general, titanium zeolite, metal oxide sol and water. The suspension can also contain residual traces of organic compounds. These can arise, for example, from the preparation of the zeolite. Other possible components are alcohols formed by hydrolysis of metalate esters or substances which, as described above, are added to promote hydrolysis of the metalate esters.

Depending on the moisture content which the mixture should have for further processing, drying may follow. This can be carried out by any conceivable method. Drying of the mixture is preferably carried out simultaneously with spraying in a spray-drying process. The spray dryers are preferably operated using inert gases, particularly preferably using nitrogen or argon.

In a likewise preferred embodiment of the process of the present invention, the titanium zeolite is mixed with at least one metal oxide which has a low content of alkali metal and alkaline earth metal ions.

If the titanium zeolite is mixed with two or more metal oxides, it is possible for the titanium zeolite to be mixed first with one metal oxide and for the resulting mixture to be mixed with a further metal oxide. If desired, this resulting mixture can in turn be mixed with a further metal oxide. It is likewise possible to mix the titanium zeolite with a mixture of two or more metal oxides.

In the preparation of an oxidic material which is low in alkali metal and alkaline earth metal ions, the alkali metal and alkaline earth metal content of this metal oxide or mixture of two or more metal oxides is generally less than 800 ppm, preferably less than 600 ppm, particularly preferably less than 500 ppm and in particular less than 200 ppm.

Such metal oxides having a low content of alkali metal and alkaline earth metal ions are, for example, pyrogenic metal oxides; a particular example of such a pyrogenic metal oxide is pyrogenic silica.

In the process of the present invention, it is naturally also possible for the mixture resulting from mixing the titanium zeolite with the metal oxide to be mixed with at least one metal oxide sol which may, if appropriate, have a low content of alkali metal and alkaline earth metal ions. The preparation of this mixture is, as described above in the case of the preparation of the mixture of titanium zeolite and metal oxide sol, in principle not subject to any restrictions. However, preference is given to spraying a suspension comprising the mixture of the titanium zeolite or zeolites and the metal oxide or oxides and the metal oxide sol or sols. The titanium zeolite content of the suspension is not subject to any restrictions as long as the processability of the suspension is ensured, as described above.

Furthermore, in the process of the present invention it is naturally also possible for a mixture resulting from mixing at least one titanium zeolite with at least one metal oxide sol to be mixed with at least one metal oxide which may, if appropriate, have a low content of alkali metal and alkaline earth metal ions. Here, mixing with the metal oxide or oxides can directly follow the preparation of the mixture from the titanium zeolite or zeolites and the metal oxide sol or sols. If, as described above, drying is necessary after the preparation of the mixture of the titanium zeolite or zeolites and the metal oxide sol or sols, it is also possible to mix the metal oxide with the dried mix after drying.

It is likewise possible in the process of the present invention to mix the titanium zeolite or zeolites simultaneously with at least one metal oxide sol and at least one metal oxide.

The mixture which is obtained according to one of the above-described embodiments of the invention is compounded in a further step of the process of the present invention. In this compounding or shaping step, further metal oxide can be introduced if desired, with the metal oxide sol prepared as described above serving as metal oxide source. This processing step can be carried out in all apparatuses known for this purpose, but preference is given to kneaders, pan mills or extruders. For industrial implementation of the process of the present invention, particular preference is given to using a pan mill.

If, as in one of the above-described embodiments, a mixture is firstly prepared from the titanium zeolite and at least one metal oxide sol, this mixture is compounded and metal oxide sol having a low content of alkali metal and alkaline earth metal ions is additionally added in the compounding step, then from 20 to 80% by weight of titanium zeolite, from 10 to 60% by weight of metal oxide and from 5 to 30% by weight of metal oxide sol are used in a preferred embodiment of the present invention. Particular preference is given to using from 40 to 70% by weight of titanium zeolite, from 15 to 30% by weight of metal oxide and from 10 to 25% by weight of metal oxide sol. These percentages are in each case based on the oxidic material finally prepared in the form of the shaped body, as described below.

In a further embodiment of the process of the present invention, mixing of the titanium zeolite or zeolites with the metal oxide or oxides which may, if appropriate, have a low content of alkali metal and alkaline earth metal ions is carried out during the compounding step. It is likewise possible to mix the titanium zeolite or zeolites, the metal oxide or oxides and, in addition, at least one metal oxide sol in the compounding step.

In this shaping step, it is additionally possible to add one or more viscosity-increasing substances as compounding agents which serve, inter alia, to increase the stability of the uncalcined shaped body, as described below. These can be all suitable substances known from the prior art. In the process of the present invention, water and mixtures of water with one or more organic substances which are miscible with water are used as compounding agents. The compounding agent can be removed again in the later calcination of the shaped body.

Preference is given to using organic, in particular hydrophilic organic, polymers such as cellulose, cellulose derivatives, e.g. methylcellulose, ethylcellulose or hexylcellulose, polyvinylpyrrolidone, ammonium (meth) acrylate, Tylose or mixtures of two or more thereof. Particular preference is given to using methyl-cellulose.

As further additives, it is possible to add ammonia, amines or amine-like compounds such as tetraalkylammonium compounds or aminoalkoxides. Such further additives are described in EP-A 0 389 041, EP-A 0 200 260 and WO 95/19222, whose relevant contents are hereby fully incorporated by reference into the disclosure of the present patent application.

In place of basic additives, it is also possible to use acidic additives. Preference is given to organic acid compounds which can be burnt out by calcination after the shaping step. Particular preference is given to carboxylic acids.

The amount of these auxiliaries is preferably from 1 to 10% by weight, particularly preferably from 2 to 7% by weight, in each case based on the shaped body finally produced, as described below.

To influence properties of the shaped body, e.g. transport pore volume, transport pore diameter and transport pore distribution, it is possible to add further substances, preferably organic compounds, in particular organic polymers, as further additives which can also influence the deformability of the composition. Such additives include alginates, polyvinylpyrrolidones, starch, cellulose, polyethers, polyesters, polyamides, polyamines, polyimines, polyalkenes, polystyrene, styrene copolymers, polyacrylates, polymethacrylates, fatty acids such as stearic acid, high molecular weight polyalkylene glycols such as polyethylene glycol, polypropylene glycol or polybutylene glycol, or mixtures of two or more thereof. The total amount of these substances, based on the shaped body finally produced, as described below, is preferably from 0.5 to 10% by weight, particularly preferably from 1 to 6% by weight The order in which the above-described additives are added to the mixture obtained according to one of the above-described methods is not critical. It is equally possible firstly to introduce further metal oxide via metal oxide sol and subsequently to introduce the viscosity-increasing substances and then the substances which influence the transport properties and/or the deformability of the compounded mass or to use any other order.

If desired, the generally still pulverulent mixture can be homogenized in the kneader or extruder for from 10 to 180 minutes before compounding. This is generally carried out at temperatures in the range from about 10° C. to the boiling point of the compounding agent and at atmospheric pressure or under slightly superatmospheric pressure. The mixture is kneaded until an extrudable mass has been obtained.

The composition available for shaping after compounding has, in the process of the present invention, a proportion of metal oxide of at least 10% by weight, preferably at least 15% by weight, particularly preferably at least 20% by weight, in particular at least 30% by weight, based on the total composition.

In principle, kneading and shaping can be carried out using all conventional kneading and shaping apparatuses and processes as are well known from the prior art and are suitable for the production of, for example, shaped catalyst bodies.

Preference is given to using processes in which shaping is carried out by extrusion in customary extruders, for example to form extrudates having a diameter of usually from about 1 to about 10 mm, in particular from about 1.5 to about 5 mm. Such extrusion apparatuses are described, for example, in Ullmanns "Enzyklopädie der Technischen Chemie", 4th edition, vol. 2 (1972), p. 295 ff. Apart from the use of a screw extruder, the use of a ram extruder is likewise preferred. In the case of industrial implementation of the process, particular preference is given to the use of screw extruders.

The extrudates are either rods or honeycombs. The honeycombs can have any desired shape. The extrudates can be, for example, round rods, tubes or star-shaped extrudates. The honeycombs can also have any diameter. The external shape and the diameter are generally determined by the process engineering requirements of the process in which the shaped bodies are to be used.

After extrusion, the shaped bodies obtained are generally dried at from 50 to 250° C., preferably from 80 to 250° C., at pressures of generally from 0.01 to 5 bar, preferably from 0.5 to 1.5 bar, for a period of from about 1 to 20 hours.

In a preferred embodiment, the oxidic material is, regardless of whether it is in the form of a shaped body or powder, calcined before it is reacted further according to step (b). This subsequent calcination is carried out at from 250 to 800° C., preferably from 350 to 600° C. and particularly preferably from 400 to 500° C. The pressure range is similar to that for drying. In general, calcination is carried out in an oxygen-containing atmosphere, with the oxygen content being from 0.1 to 90% by volume, preferably from 0.2 to 22% by volume, particularly preferably from 0.2 to 10% by volume.

A specific embodiment of the invention comprises adding the metal oxide sol to the suspension as described above, drying the resulting suspension, preferably by spray drying, and calcining the resulting powder. The dried and calcined product can then be processed further as described above.

The oxidic material obtained in (a) can quite generally be a powder or a shaped body. It is immaterial whether the powder is obtained directly from the preparation of the oxidic material or the powder is produced by specific comminution of a shaped body.

Of course, the above-described extrudates can be subjected to further treatment to bring them into the desired form. All comminution processes are conceivable for this purpose, for example crushing or breaking up the shaped bodies, as are further chemical treatments, for example as described above. If comminution takes place, preference is given to producing granules or crushed material having a particle diameter of from 0.1 to 5 mm, in particular from 0.5 to 2 mm.

These granules or this crushed material and also shaped bodies produced in another way contain virtually no particles smaller than about 0.1 mm.

If the oxidic material obtained according to (a) is reacted with at least one silane or silane derivative in at least one solvent, all solvents suitable for this reaction are conceivable. In particular, the solvent or solvent mixture can be matched to the oxidic material and the silane or silane derivative.

This can be carried out by any conceivable procedures for bringing the silane or silane derivative, oxidic material and solvent into contact with one another. Thus, for example, the oxidic material can be introduced into a solvent or a solvent mixture and at least one silane or at least one silane derivative or a mixture of two or more thereof can subsequently be introduced into the resulting solution or suspension. Of course, the silane or silanes or the silane derivative or derivatives or the mixture of two or more thereof can initially be present as a solution or suspension in a solvent or solvent mixture.

In a preferred embodiment of the process of the present invention, the oxidic material which has been calcined as described in (a) is added to a solution in which the silane or silanes or the silane derivative or derivatives or the mixture of two or more thereof is present in solution in an anhydrous solvent or solvent mixture.

The concentration of oxidic material and/or the silane or silanes or the silane derivative or derivatives or the mixture of two or more thereof in the starting solutions which are, as described above, mixed together or in the solution in which the reaction takes place is not critical and can be adapted to the requirements of the way in which the reaction is carried out. In a preferred embodiment of the process of the present invention, in which the oxidic material is added to a solution of the silane or silanes or the silane derivative or derivatives or the mixture of two or more thereof, the concentration of the silane or silanes or the silane derivative or derivatives or the mixture of two or more thereof in the solution is generally in a range which ensures that the reaction of silane or silane derivative with the oxidic material takes place to the desired extent. The concentration is preferably in a range up to 5% by weight, particularly preferably about 2% by weight, in each case based on the total weight of the solution made up of silane (derivative) and solvent.

The reaction of the oxidic material with the silane or silanes or the silane derivative or derivatives or the mixture of two or more thereof takes place at temperatures which are preferably below the boiling point of the solvents present. In this context, it is also conceivable, for example, to increase the temperatureIduring the reaction, for example to accelerate the reaction.

The pressure under which the reaction is carried out is largely noncritical and can be matched to the specific requirements of the way in which the reaction is carried out.

The time for which the oxidic material is reacted with the silane (derivative) can be chosen essentially freely in the process of the present invention and can be adapted to the desired degree of reaction and/or the reactivity of the reactants and/or the reaction temperature and/or the reaction pressure. In particular, the reaction time is in the range from a few minutes to a number of hours.

Of course, it is also possible to react the oxidic material with one or more silane (derivatives) in a plurality of stages in the process of the present invention. In particular, the oxidic material can be reacted with the silane (derivative) in a solvent or solvent mixture and further silane (derivative), if appropriate dissolved in another solvent or solvent mixture, can be added to the resulting solution comprising the reaction product. Of course, the further silane (derivative) can be identical to or different from the silane (derivative) used originally.

In a further embodiment of the process of the present invention, it is of course also possible to react two or more different oxidic materials with, if desired, two or more different silane (derivatives) in, if desired, two or more stages in, if desired, two or more different solvents or solvent mixtures.

Directly subsequent to the reaction of the oxidic material with the silane or silanes or the silane derivative or derivatives or the mixture of two or more thereof, the solvent or solvents is/are removed to give the oxidic reaction product. Once again, all conceivable methods are possible for this. It is possible, for example, to reduce the pressure and thus take off the solvent or solvents. It is likewise conceivable to increase the temperature above the boiling point of the solvent or the boiling points of the solvents. Of course, these methods can also be combined.

Accordingly, the present invention also provides a process as described above in which the solvent or solvents is/are removed from the mixture prepared in (i) either by increasing the temperature or by lowering the pressure or by increasing the temperature and reducing the pressure.

After drying as described above by removal of solvent, the oxidic reaction product obtained is calcined in a directly subsequent step. The temperature chosen for the calcination of the oxidic reaction product is not critical, as long as it is ensured that organic radicals which are present in the reaction product as a result of the reaction of the oxidic material with the silane or silanes or the silane derivative or derivatives or the mixture of two or more thereof are removed without leaving a residue by the calcination, so that no silicon-carbon bonds are present in the oxide resulting after the calcination. The calcination temperatures are preferably in the range from 200 to 750° C., particularly preferably in the range from 400 to 500° C. As in the procedure described above for the drying step, the calcination can also be carried out under reduced pressure.

The duration of the calcination is once again not critical, as long as it is ensured that there arc no longer any silicon-carbon bonds in the oxide resulting after the calcination. In general, the calcination times are in the range from 0.5 to 24 hours, preferably in the range from 0.75 to 12 hours and particularly preferably in the range from 1 to 5 hours.

In a preferred embodiment of the process of the present invention, drying and calcination are carried out together in a single step. The mixture comprising the solvent and oxidic reaction product is, in particular, therefore subjected after the reaction to a temperature and pressure range in which the solvent or solvents is/are removed and the oxidic reaction product is calcined to give the oxide of the present invention.

Accordingly, the present invention also provides a process as described above in which the solvent or solvents is/are removed at a temperature at which the solvent or solvents is/are removed and the oxidic reaction product or products is/are also calcined.

Of course, it is also possible to conceive of a process in which the temperature to which the mixture comprising solvent and oxidic reaction product is subjected is increased continuously or in steps so that there is a gradual transition from drying to calcination. In particular, the pressure can also be varied here and the drying and calcination effect produced by the temperature can thus be influenced, preferably reinforced.

The embodiment of the process of the present invention in which the oxidic material is reacted in solution with the silane (derivative) is preferably employed when the silane (derivative) is a liquid at the desired reaction temperature and the desired reaction pressure. However, it is likewise conceivable for gaseous silane (derivative) to be introduced into the solvent or solvents, dissolved in the solvent and reacted with the oxidic material.

In a further preferred embodiment of the process of the invention, the oxidic material obtained according to (a) is reacted with at least one silane or at least one silane derivative or a mixture of two or more thereof in the gas phase. This process is preferably employed when the silane (derivative) is gaseous at the desired reaction temperature and the desired reaction pressure.

In a further preferred embodiment, the gaseous silane (derivative) is diluted with one or more inert gases before it is brought into contact with the oxidic material. If two or more silanes or silane derivatives are used for the reaction, each of these silanes or silane derivatives can be diluted separately with at least one suitable inert gas. The individual gas mixtures can then be combined and brought into contact with the oxidic material as a single stream. It is likewise conceivable for the individual gas mixtures to be separately brought into contact with the oxidic material, in which case the individual mixtures can be brought into contact with the oxidic material either simultaneously or successively.

This preferred embodiment is generally carried out at temperatures at which the silane or silane derivative has a vapor pressure which is sufficient for the reaction. The pressure chosen can be matched to the desired reaction conditions.

In general, the reaction in this embodiment is carried out for a period of from 0.5 to 10 hours, but longer or shorter times can also be selected if this is made necessary by the reaction parameters such as pressure and temperature or by a specific choice of the reactants.

It is of course also possible, in the process of the present invention, for the oxidic material firstly to be brought into contact with a silane (derivative) in the gas phase and subsequently to be brought into contact with a silane (derivative) in solution. This can be achieved, for example, by firstly bringing the oxidic material into contact with a silane (derivative) in the gas phase, as described above, and subsequently bringing it into contact with a solution comprising solvent and silane (derivative). Furthermore, for example, it is conceivable to react the oxidic material with a silane (derivative) in solution and to pass further gaseous silane (derivative) into the solution obtained.

The gas-phase treatment of the oxidic material with the silane (derivative) is followed directly by calcination of the oxidic reaction product obtained. Here, reference may be made to the embodiments of the calcination as have been described above in connection with the reaction in solution.

While the atmosphere in which the calcination is carried out is subject to essentially no restrictions, an atmosphere comprising oxygen and calcination in the absence of air are preferred. Particular preference is given to an oxygen atmosphere.

The present invention therefore also provides a process as described above in which the calcination takes place at above 200° C. in the presence of oxygen.

All silanes and/or silane derivatives which can be reacted with a crystalline silicate phase having at least one zeolite structure to produce a noncrystalline silicate phase on this crystalline silicate phase are suitable for the process of the present invention.

In a preferred embodiment, the present invention provides a process as described above in which the silane or silanes or the silane derivative or derivatives is/are selected from the group consisting of trichlorosilane, silicon tetrachloride, methylhydrogendichlorosilane, monomethylchlorosilane, dimethylchlorosilane and trimethylchlorosilane, tetraalkyl orthosilicates having identical or different alkyl radicals having more than 2 carbon atoms, hydrolysates of these tetraalkyl orthosilicates, alkylalkoxysilanes having identical or different alkyl radicals and alkoxy radicals and the abovementioned silanes and silane derivatives which additionally bear one or more functional groups selected from the group consisting of hydroxy, carboxyl, vinyl, glycidyl, amino and aminoalkyl groups.

For the purposes of the present invention, particular preference is given to silanes or silane derivatives which have at least one silicon-carbon bond.

Accordingly, the present invention provides a process as described above in which the silane or silanes or the silane derivative or derivatives is/are selected from the group consisting of methylhydrogendichlorosilane, monomethylchlorosilane, dimethylchlorosilane and trimethylchlorosilane, tetraalkyl orthosilicates having identical or different alkyl radicals having more than 2 carbon atoms, hydrolysates of these tetraalkyl orthosilicates, alkylalkoxysilanes having identical or different alkyl radicals and alkoxy radicals and the abovementioned silanes and silane derivatives which additionally bear one or more functional groups selected from the group consisting of hydroxy, carboxyl, vinyl, glycidyl, amino and aminoalkyl groups.

In a very particularly preferred embodiment, the present invention provides a process in which an oxidic material in the form of a shaped body produced from titanium silicalite of the TS-1 structure and silicon dioxide binder is reacted with 3-aminopropyltriethoxysilane dissolved in a suitable anhydrous solvent.

The oxide of the present invention or the oxide prepared in the process of the present invention is preferably used as catalyst.

Accordingly, the present invention also provides for the use of an oxide as described above or an oxide prepared by a process as described above as catalyst.

In particular, the oxide is used for the reaction of organic compounds. Specific examples which may be mentioned are:

the epoxidation of olefins, e.g. the preparation of propene oxide from propene and $H_2O_2$ or from propene and mixtures which release $H_2O_2$ in situ;

hydroxylations such as the hydroxylation of monocyclic, bicyclic or polycyclic aromatics to form monosubstituted, disubstituted or more highly substituted hydroxy aromatics, for example the reaction of phenol and $H_2O_2$ or of phenol and mixtures which release $H_2O_2$ in situ to produce hydroquinone;

the conversion of alkanes into alcohols, aldehydes and acids;

oxime formation from ketones in the presence of $H_2O_2$ or mixtures which release $H_2O_2$ in situ and ammonia (ammonoximation), for example the preparation of cyclohexanone oxime from cyclohexanone;

isomerization reactions such as the conversion of epoxides into aldehydes;

and further reactions which are described in the literature and can be carried out using such shaped bodies, in particular zeolite catalysts, as described, for example, by W. Hölderich in "Zeolites: Catalysts for the Synthesis of Organic Compounds", Elsevier, Stud. Surf. Sci. Catal., 49, Amsterdam (1989), pp. 69 to 93, and, particularly for possible oxidation reactions, by B. Notari in Stud. Surf. Sci. Catal., 37(1987),pp.413 to 425, or in Advances in Catalysis, Vol. 41, Academic Press (1996), pp. 253 to 334.

In a particularly preferred embodiment, the present invention provides for the use of the oxide as catalyst for the epoxidation of olefins using a hydroperoxide, preferably using hydrogen peroxide.

Accordingly, the present invention also provides for the use of the oxide as described above as catalyst for the epoxidation of olefins.

Alkenes which can be epoxidized in this way include, for example, ethene, propene, 1-butene, 2-butene, isobutene, butadiene, pentenes, piperylene, hexenes, hexadienes, heptenes, octenes, diisobutene, trimethylpentene, nonenes, dodecene, tridecene, tetradecene to eicosene, tripropene and tetrapropene, polybutadienes, polyisobutenes, isoprene, terpenes, geraniol, linalool, linalyl acetate, methylenecyclopropane, cyclopentene, cyclohexene, norbornene, cycloheptene, vinylcyclohexane, vinyloxirane, vinylcyclohexene, styrene, cyclooctene, cyclooctadiene, vinylnorbornene, indene, tetrahydroindene, methylstyrene, dicyclopentadiene, divinylbenzene, cyclododecene, cyclododecatriene, stilbene, diphenylbutadiene, vitamin A, beta-carotene, vinylidene fluoride, allyl halides, crotyl chloride, methallyl chloride, dichlorbutene, allyl alcohol, methallyl alcohol, butenols, butenediols, cyclopentenediols, pentenols, octadienols, tridecenols, unsaturated steroids, ethoxyethene, isoeugenol, anethole, unsaturated carboxylic acids such as acrylic acid, methacrylic acid, crotonic acid, maleic acid, vinyl acetic acid, unsaturated fatty acids, such as oleic acid, linoleic acid, palmitic acid, naturally occurring fats and oils.

The oxides discussed in detail above are particularly useful for the epoxidation of alkenes having from 2 to 8 carbon atoms, more preferably ethene, propene or butene and especially propene, to give the corresponding alkene oxides.

After use as catalyst, the oxides of the present invention can be regenerated by any suitable methods for reuse as catalyst. Specific examples of suitable methods are the following:

1. a process comprising heating an exhausted catalyst at a temperature below 400° C. but above 150° C. in the presence of molecular oxygen for a period which is sufficient for increasing the activity of the exhausted catalyst, as described in EP-A 0 743 094;
2. a process comprising heating an exhausted catalyst at from 150° C. to 700° C. in the presence of a gas stream containing not more than 5% by volume of molecular oxygen for a period which is sufficient to improve the activity of the exhausted catalyst, as described in EP-A 0 790 075;
3. a process in which an exhausted catalyst is treated by heating at from 400 to 500° C. in the presence of an oxygen-containing gas or by washing with a solvent, preferably at a temperature which is from 5° C. to 150° C. higher than the temperature employed during the reaction, as described in JP-A3 11 45 36;
4. a process in which an exhausted catalyst is treated by calcination at 550° C. in air or by washing with solvents so as to restore the activity of the catalyst, as described in "Proc. 7th Intern. Zeolite Conf. 1986 (Tokyo)";
5. a process for regenerating a catalyst which comprises the steps (A) and (B):
   (A) heating an at least partially deactivated catalyst to a temperature in the range from 250° C. to 600° C. in an atmosphere which contains less than 2% by volume of oxygen, and
   (B) treating the catalyst at a temperature in the range from 250 to 800° C., preferably from 350 to 600° C., with a gas stream which has a content of an oxygen-releasing substance or of oxygen or of a mixture of two or more thereof in the range from 0.1 to 4% by volume,
and may further comprise the additional steps (C) and (D),
   (C) treating the catalyst at a temperature in the range from 250 to 800° C., preferably from 350 to 600° C., with a gas stream which has a content of an oxygen-releasing substance or of oxygen or of a mixture of two or more thereof in the range from >4 to 100% by volume,
   (D) cooling the regenerated catalyst obtained in step (C) in a stream of inert gas which contains up to 20% by volume of the vapor of a liquid selected from the group consisting of water, alcohols, aldehydes, ketones, ethers, acids, esters, nitriles, hydrocarbons and mixtures of two or more thereof.

Details of this process may be found in DE-A 197 23 949.8.

It is also conceivable for the catalyst to be regenerated by washing with at least one hydrogen peroxide solution or with one or more oxidizing acids. Of course, the above-described methods can also be combined with one another in an appropriate manner.

If the oxides of the present invention are used as catalysts, they have a higher selectivity than catalysts which have been prepared in the same way except for the treatment with silanes. Furthermore, after use as catalyst, the oxides of the present invention are more stable mechanically than catalysts which have been treated with silanes but have not been calcined directly subsequent to the reaction with silanes or directly subsequent to drying.

EXAMPLES

Example 1

Preparation of TS-1

910 g of tetraethyl orthosilicate were placed in a four-necked flask (4 l capacity) and 15 g of tetraisopropyl orthotitanate were added from a dropping funnel over a period of 30 minutes while stirring (250 rpm, blade stirrer). A clear, colorless mixture was formed. This was subsequently admixed with 1 600 g of a 20% strength by weight tetrapropylammonium hydroxide solution (alkali metal content <10 ppm) and the mixture was stirred for another one hour. At 90–100° C., the alcohol mixture formed in the hydrolysis (about 900 g) was distilled off. 3 l of water were added and the now slightly opaque sol was transferred to a 5 l stirring autoclave made of stainless steel.

The autoclave was closed and, while stirring (anchor stirrer, 200 rpm), heated at 3° C./min to a reaction temperature of 175° C. After 92 hours, the reaction was complete. The cooled reaction mixture (white suspension) was centrifuged and the solid was washed with water until neutral. The resulting solid was dried at 110° C. for 24 hours (weight obtained: 298 g).

The template compound remaining in the zeolite was subsequently burned off at 550° C. in air over a period of 5 hours. (Loss on calcination: 14% by weight).

According to wet chemical analysis, the pure white product had a Ti content of 1.3% by weight and a residual alkali metal content of less than 100 ppm. The yield based on $SiO_2$ used was 97%. The crystallites had a size of from 0.05 to 0.25 $\mu$m, and the product displayed a typical band at about 960 $cm^{-1}$ in the IR spectrum.

Example 2

Production of 1 mm Extrudates of TS-1

120 g of titanium silicalite powder, synthesized as described in example 1, were mixed with 48 g of tetramethoxysilane for 2 hours in a kneader. 6 g of Walocel (methylcellulose) were subsequently added. As compounding liquid, 77 ml of a water/methanol mixture having a methanol content of 25% by weight was then added. This mixture was compounded for a further 2 hours in the kneader and then extruded to form 1 mm extrudates. The extrudates obtained were dried at 120° C. for 16 hours and then calcined at 500° C. for 5 hours.

Example 3

15 g of the catalyst from example 2 was heated at 500° C. for 3 hours and cooled in a dessicator with exclusion of moisture.

1.9 g of 3-aminopropyltriethoxysilane were dissolved in 250 ml of anhydrous ethanol and the cooled catalyst extrudates were added in a closed stirred flask. The mixture was mixed at a low stirrer speed for 10 hours.

The solvent was subsequently evaporated and the catalyst extrudates were calcined at 550° C. in air for 6 hours. The weight increase resulting from the modification was 2%, based on the initial material.

Example 4

The catalysts from example 2 (unmodified) and example 3 (according to the present invention) were compared in the epoxidation of propene using hydrogen peroxide.

For this purpose, 14 g of the catalyst extrudates were in each case installed in a tube reactor. At 40° C., a mixture of 7.6 g/h of hydrogen peroxide (40% strength by weight) in 43 g/h of methanol and 7.3 g/h of propene was passed over the catalysts.

The output from the reactor was in each case analyzed by gas chromatography (column: Stabilwax-Carbowax).

Table 1 below shows the different selectivity behavior of the two catalysts in respect of the undesirable by-products such as methyoxypropanols and propanediol at otherwise equal formation of propylene oxide.

TABLE 1

| Catalyst | Running time/h | Propylene oxide/ % by weight | Methoxy-propanols/ppm | Propanediol/ ppm |
|---|---|---|---|---|
| Ex. 2 | 123 | 7.4 | 3300 | 400 |
| Ex. 2 | 192 | 7.6 | 3300 | 700 |
| Ex. 2 | 290 | 7.4 | 3100 | 400 |
| Ex. 2 | 411 | 7.3 | 3700 | n.d. |
| Ex. 2 | 507 | 7.1 | 3800 | 600 |
| Ex. 3 | 121 | 7.2 | 1900 | 300 |
| Ex. 3 | 194 | 7.5 | 3100 | 300 |
| Ex. 3 | 287 | 7.6 | 3000 | n.d. |
| Ex. 3 | 385 | 7.0 | 1700 | 300 |
| Ex. 3 | 481 | 7.0 | 3200 | 500 |

Example 5

Comparison of the Mechanical Stability 20 1 mm extrudates of TS-1 produced as described in example 2 (comparative example) and 20 1 mm extrudates of TS-1 produced according to the present invention as described in example 3 were tested in terms of their lateral compressive strength. The results are shown in table 2 below.

TABLE 2

|  | Unmodified extrudates | Extrudates according to the present invention |
|---|---|---|
| Lateral compressive strength/N (mean) | 10.8 | 16.7 |

We claim:
1. A process for the epoxidation of olefins, comprising
   (a) preparing an oxidic material comprising at least the elements Si and Ti; and at least one crystalline silicate phase having at least one zeolite structure;
   (b) reacting said oxidic material obtained from (a):
      (i) with at least one silane, one silane derivative or mixtures thereof in at least one solvent to give a mixture comprising at least one oxidic reaction product and the solvent; removing the at least one solvent from the mixture directly subsequent to the reacting; and calcinating the at least one oxidic reaction product directly after removing the at least one solvent; or
      (ii) in a gas phase with at least one silane, silane derivative or mixtures thereof to give at least one oxidic reaction product; and calcinating the at least one oxidic reaction product directly after the reacting;
   wherein the at least one silane, silane derivative or mixtures thereof comprises at least one silicon-carbon bond, the oxide comprises at least the elements Si and Ti, non-crystalline silicon dioxide, and at least one crystalline silicate phase which comprises at least one zeolite structure,
   the non-crystalline silicon dioxide being applied to the at least one crystalline silicate phase having at least one zeolite structure, and wherein the oxide does not comprise silicon-carbon bonds; and
   (c) contacting an olefin with a hydroperoxide and said oxide.

2. The process of claim 1, wherein the crystalline silicate phase or phases comprises at least one zeolite structure selected from the group consisting of structures assigned X-ray crystalographically to the ABW, ACO, AEI, AEL, AEN, AET, AFG, AFI, AFN, AFO, AFR, AFS, AFT, AFX, AFY, AHT, ANA, APC, APD, AST, ATN, ATO, ATS, ATT, ATV, AWO, AWW, BEA, BIK, BOG, BPH, BRE, CAN, CAS, CFI, CGF, CGS, CHA, CHI, CLO, CON, CZP, DAC, DDR, DFO, DFT, DOH, DON, EAB, EDI, EMT, EPI, ERI, ESV, EUO, FAU, FER, GIS, GME, GOO, HEU, IFR, ISV, ITE, JBW, KFI, LAU, LEV, LIO, LOS, LOV, LTA, LTL, LTN, MAZ, MEL MEL, MEP, MER, MFI, MFS, MON, MOR, MSO, MTF, MTN, MTT, MTW, MWW, NAT, NES, NON, OFF, OSI, PAR, PAU, PHI, RHO, RON, RSN, RTE, RTH, RUT, SAO, SAT, SBE, SBS, SBT, SFF, SGT, SOD, STF, STI, STT, TER, THO, TON, TSC, VET, VFI, VNI, VSV, WIE, WEN, YUG, ZON, and mixtures thereof.

3. The process as claimed in claim 1, wherein the oxide further comprises at least one element selected from the group consisting of Al, b, Fe, Ga, V, Zr, Ge, Sn, Te, Nb, Ta, and Cr.

4. The process as claimed in claim 1, wherein the at least one solvent is removed from the mixture prepared in (i) by increasing the temperature, lowering the pressuring or both.

5. The process as claimed in claim 1, wherein the at least one solvent is removed at a temperature at which the at least one solvent is removed and the at least one oxidic reaction product is also calcined.

6. The process as claimed in claim 1, wherein the calcinating is conducted at a temperature of above 200° C. in the presence of oxygen.

7. The process as claimed in claim 1, wherein the at least one silane, one silane derivative or mixtures thereof are selected from the group consisting of methylhydrogendichlorosilane, monomethylchlorosilane, dimethylchlorosilane, trimethylchlorosilane, alkylalkoxysilanes having identical alkyl radicals and identical alkoxy radicals, alkylalkoxysilanes having identical alkyl radicals and different alkoxy radicals, alkylalkoxysilanes having different alkyl radicals and identical alkoxy radicals, and alkylalkoxysilanes having different alkyl radicals and different alkoxy radicals, and wherein the at least one silane, one silane derivative or mixtures thereof bear one or more functional groups selected from the group consisting of hydroxyl, carboxy, vinyl, glycidyl, amino and amino groups.

8. The process as claimed in claim 1, wherein the at least one oxidic reaction product is in the form of a shaped body produced from titanium silicate of the TS-1 structure and silicon dioxide binder and which is reacted with 3-aminopropyltriethoxysilane dissolved in a suitable anhydrous solvent.

9. The process as claimed in claim 1, wherein the olefin comprises from 2 to 8 carbon atoms.

10. The process as claimed in claim 1, wherein the hydroperoxide is hydrogen peroxide.

* * * * *